United States Patent [19]
Opher et al.

[11] Patent Number: 5,408,469
[45] Date of Patent: Apr. 18, 1995

[54] ROUTING DEVICE UTILIZING AN ATM SWITCH AS A MULTI-CHANNEL BACKPLANE IN A COMMUNICATION NETWORK

[75] Inventors: Ayal Opher; Gaurav Garg, both of Mountain View; Philip Kruzinski, Redwood City; Som Sikdar, San Jose, all of Calif.

[73] Assignee: SynOptics Communications, Inc., Santa Clara, Calif.

[21] Appl. No.: 96,783

[22] Filed: Jul. 22, 1993

[51] Int. Cl.⁶ .............................................. H04Q 11/04
[52] U.S. Cl. ...................... 370/60.1; 370/60; 370/94.1; 370/110.1
[58] Field of Search ................. 370/60.1, 17, 60, 94.1, 370/58.1, 58.3, 54, 56, 82, 110.1

[56] References Cited

U.S. PATENT DOCUMENTS

| | | | |
|---|---|---|---|
| 4,922,486 | 5/1990 | Lidinsky et al. | 370/94.1 |
| 5,021,949 | 6/1991 | Morten et al. | 370/60 |
| 5,271,000 | 12/1993 | Engbersen et al. | 370/17 |

OTHER PUBLICATIONS

*Lattis EZ-View*™, Product Brochure, SynOptics Communication, Inc., Santa Clara, Cailf.
*LattisNet Manager*™ *for DOS*, Product Brochure, SynOptics Communication, Inc., Santa Clara, Calif.
*LattisNet* ® *Network Management, Lattis Views* ™ *Enterprise Network Management Product*, Product Brochure, SynOptics Communication, Inc., Santa Clara, Calif.
*LattisNet* ® *Product Overview, A comprehensive Desription of the LattisNet Product Family*, SynOptics Communications, Inc., Santa Clara, Calif., 1991.
Alles, A., *Tutorial ATM in Private Networking*, Hughes LAN Systems, Mountain View, Calif., 1992.
de Pycker, M., *Asynchronous Transfer Mode Solution for Broadband ISDN*, Ellis Horwood, Ltd., West Sussex, England, pp. 55–124, 1991.
Handel, R. and Huber, M. N., *Integrated Broadband Networks, an Introduction to ATM-based Networks*, Addison-Wesley, 1991 pp. 14–17, 84–91, 113–136.

*Primary Examiner*—Douglas W. Olms
*Assistant Examiner*—Shick Hom
*Attorney, Agent, or Firm*—Blakely, Sokoloff, Taylor & Zafman

[57] ABSTRACT

A data communications network providing for a multiport router and providing for use of an asynchronous transfer mode (ATM) switch or the like as a routing backplane or packet switching engine. A router front end formats ATM cells including providing routing information in the cell header. The routing information may comprise, for example, a destination port identifier in the VPI field of the cell header. The ATM switch then switches the cell from an input port, coupled with the router front end to an output port based on the routing information. The ATM switch may also translate the routing information to provide source identification information to the destination. In a described embodiment, the multiport router is used as a backplane bus in a network concentrator.

22 Claims, 10 Drawing Sheets

ROUTING DEVICE UTILIZING AN ATM SWITCH AS A MULTI-CHANNEL BACKPLANE IN A COMMUNICATION NETWORK

BACKGROUND OF THE INVENTION

1. Field of the Invention

The present invention relates to the field of computer networking, specifically to the field of hub-based communications networks. More specifically, the present invention relates to methods and apparatus providing for a multiport router in which an asynchronous transfer mode (ATM) switch is utilized as a backplane such as may be implemented in a local area network (LAN) hub.

2. Description of the Related Art

The present invention relates to the field of ATM and similar networking system. Such systems are characterized by use of high-speed switches which act to switch message cells of a fixed size and format through the network. Below is provided a general description of ATM networks. The present invention further relates to the field of networked communications systems employing centralized concentrators or hubs which allow interconnection of devices in what is sometimes termed a star configuration. Further, the present invention relates to use of a router for routing information packets between devices interconnected by centralized concentrator.

ATM Networks

The preferred embodiment of the present invention is implemented utilizing an asynchronous transfer mode (ATM) switch as a router in a centralized concentrator. Such ATM switches are well-known in the art and, in fact, are described in various references. One such reference is Handel, R. and Huber, M. N., *Integrated Broadband Networks, an Introduction to ATM-based Networks*, published by Addison-Wesley Publishing Company, 1991 and hereinafter referred to as the Handel et al. reference. Another such reference is de Prycher, M., *Asynchronous Transfer Mode solution for broadband ISDN*, published by Ellis Horwood Limited, West Sussex, England, 1991.

In ATM switches information is communicated in fixed-size cells which comprise a well-defined and size-limited header area and user information area. ATM switches may utilize a variety of switching architectures including, for example, a backplane bus architecture (such as has been described by Hughes LAN Systems, Inc. and announced under the trademark Enterprise Hub ™), a matrix switching architecture (such as has been described with reference to both Handel et al. and de Prycher) as preferred by the present invention or other architectures, as will be mentioned briefly below. It is noted that the preferred embodiment of the present invention utilizes a matrix switching architecture for its ATM switch; however, it is thought that many of the teachings of the present invention have equal application the various other architectures mentioned herein.

The matrix switching architecture provides for switching of cells through a switch fabric which is designed to act upon information in the header area in order to provide for routing of cells in the network. The switch fabric is normally implemented in hardware, for example using large-scale integrated circuits, in order to provide for high-speed switching of cells in the network.

Standards have been adopted for ATM networks, for example, by the International Telegraph and Telephone Consultative Committee (CCITT). The CCITT standards require a header area comprising a fixed set of fields and being of a fixed size and a payload area, also referred to as a user information area, and also of a fixed size but allowing user-defined information fields. The CCITT standards define the header to be of a very limited size to keep at a minimum overhead associated with each cell

ATM Cell Format

In an ATM network, all information to be transferred is packed into fixed-size slots which are commonly referred to as cells. Of course, such fixed-size slots may be referred to with other terminology, for example, packets. In one standard ATM format (CCITT Recommendation I.150, "B-ISDN ATM Functional Characteristics", Geneva, 1991), the format is generally shown in FIG. 1($a$) and includes a 5-byte (also called octet) header field 101 and a 48-byte information field 102. The information field is defined by the standard to be available to the user and the header field is defined by the standard to carry information pertaining to ATM functionality, in particular, information for identification of the cells by means of a label. See, Handel et al., at pages 14–17.

The standardized format for the header field 101 is better shown in FIG. 1($b$) and 1($c$) and is described in greater detail with reference to Handel et al., at pages 84–91. The header field 101 will be discussed in greater detail below; however, it is worthwhile mentioning here that the header field 101 comprises two fields: (1) a virtual channel identifier (VCI) and (2) a virtual path identifier (VPI). The VPI field is defined as an eight-bit field in one format (see FIG. 1($b$)) and as a twelve-bit field in another format (see FIG. 1($c$)) and is defined to be used for routing of the cell. The VCI field is also used for routing in the defined format and is defined as a sixteen-bit field.

The de Prycher reference further describes the format of the ATM cell, for example at pages 55–124 and, especially at pages 106–108.

ATM Switching

Two primary tasks are generally accomplished by an ATM switch: (1) translation of VPI/VCI information and (2) transport of cells from the input port to the correct output port. The functions of an ATM switch are more fully described in Handel et al. at pages 113–136.

A switch is typically constructed of a plurality of switching elements which act together to transport a cell from the input of the switch to the correct output. Various types of switching elements are well-known such as the already-mentioned matrix switching elements and bus-type switching elements. In addition, an ATM switch may utilize central memory switching elements, and ring-type switching elements. Each of these are discussed in greater detail in the Handel et al. reference and each carries out the above-mentioned two primary tasks.

Translation of the VPI/VCI information is important because in a standard ATM network the contents of these fields only has local meaning (i.e., the same data would be interpreted differently by each switch). Thus, the VPI/VCI information is translated by each switch and changed prior to the cell being output from the switch. This translation is accomplished through use of translation tables which are loaded into the switch fabric, generally under control of a switch controller.

Importantly, it is the switch fabric, as controlled by the translation tables, which provides for making routing decisions within the switch. The translation tables may updated from time-to-time in order to provide for new virtual paths/virtual circuits or to remove existing ones (this process is sometimes referred to as call set-up and tear-down). Thus, a VPI/VCI is supplied in the cell header at the input of the switch and the VPI/VCI is translated by the switch fabric and the cell is routed to the appropriate output port. However, generally, the device generating the cell has no knowledge of the specific output port on which switch will send the cell. Rather, this routing decision is made by the switch based on the then current translation tables.

As will be seen, the present invention provides for an ATM switch having preconfigured VPI/VCIs and allows for selection of an appropriate output path by the device generating the cell (i.e., the device generating the cell provides for the routing decision rather than the ATM switch.)

Network Concentrators

Network concentrators or hubs are well-known in the art. Two well-known examples of network concentrators are the SynOptics' LattisNet System 2000 TM and LattisNet System 3000 TM concentrators. The concentrators are better described in "LattisNet ® Product Overview, A comprehensive Description of the Lattisnet Product Family" (the "LattisNet Product Brochure"), available from SynOptics Communications, Inc. of Santa Clara, Calif., the assignee of the present invention.

Network concentrators typically comprise a number modules, each module having a plurality of ports to which local area network segments may be connected. A local area network segment may support one or more devices such as data terminals, computers, file servers, printers, etc. The various modules are interconnected through a backplane bus or the like in the concentrator module. Thus, a device attached to module 1 may communicate an information packet to the devices attached to the other modules by providing communicating the packet onto the local area network segment connected with module 1 and, module 1, when it receives the packet, communicating the packet onto the backplane bus. The other modules may then receive the packet from the backplane bus and communicate the packet to the devices coupled with network segments connected to the other modules. The various modules may support, for example, Ethernet (or other CSMA/CD protocol), Token Ring and/or FDDI networks.

Objects of the Invention

It is an object of the present invention to utilize an ATM switch as a routing backplane in a network concentrator to provide for relatively fast routing of information packets between LAN segments coup led to the network concentrator.

This and other objects of the present invention will be understood with reference to the detailed description of the preferred embodiment and the accompanying drawings.

SUMMARY OF THE INVENTION

The present invention relates to methods and apparatus providing for a multiport router in which an asynchronous transfer mode (ATM) switch is utilized as a multi-port, non-blocking backplane. An exemplary application of the present invention is provided in which the multiport router is utilized in a concentrator (also referred to as a hub) in a local area network (LAN).

In particular, the present invention provides for a multiport router for routing of information packets, such as for example Ethernet or CSMA/CD packets, through a network where the multiport router provides for front end modules which segment the information packets into ATM cells. The front end modules provide, in the cell header, routing information (such as by providing destination port information) and then the cell is provided at an input to a ATM switch.

The switch fabric of the ATM switch switches the cell based on the routing information provided by the front end module to an output port of the switch. In the described system, the ATM switch is preconfigured to provide a fully connected topology of front-end module to front-end module connections.

In an embodiment of the invention, the multiport router is utilized as a backplane in a local area network concentrator (also referred to as a hub).

These and other aspects of the present invention will be discussed in greater detail with reference to the detailed description and the accompanying figures.

Figure 1A:
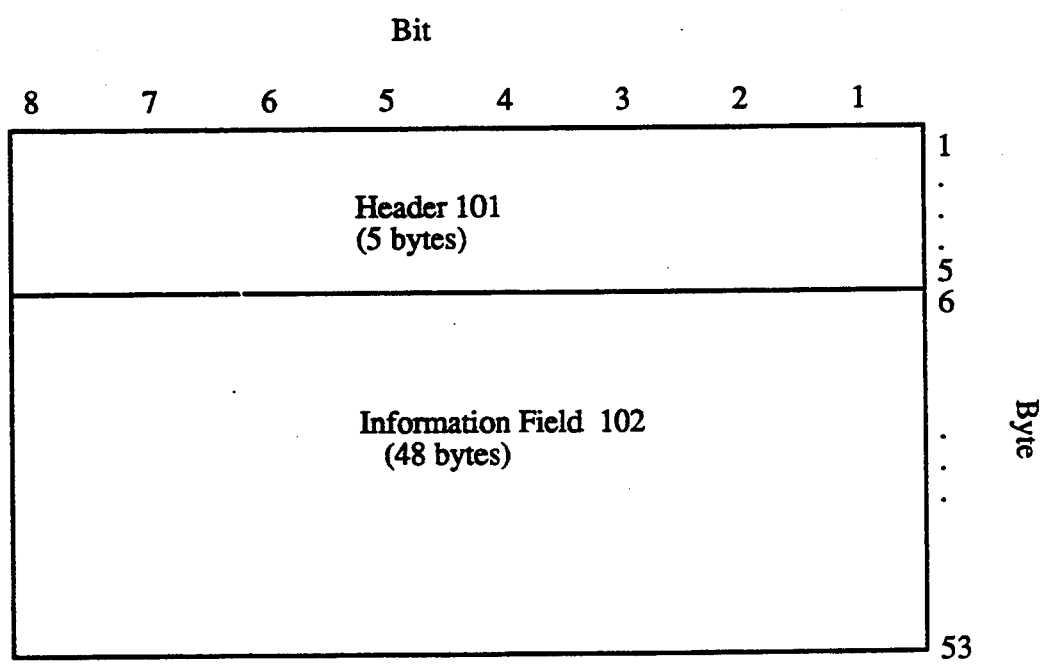
FIGS. 1(a), (b) and (c) are diagrams illustrating the format of an ATM cell as may be utilized in the present invention.

For ease of reference, it might be pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION OF THE PREFERRED EMBODIMENT

What is described herein is a method and apparatus for utilizing an Asynchronous Transfer Mode (ATM) switch as a router backplane in a hub for a local area network. In the following description, numerous specific details are set forth in order to provide a thorough understanding of the present invention. It will be obvious, however, to one skilled in the an that the present invention may be practiced without these specific details. In other instances, well-known circuits, structures and techniques have not been shown in detail in order not to unnecessarily obscure the present invention.

OVERVIEW OF A COMMUNICATIONS NETWORK SUCH AS MAY UTILIZE THE PRESENT INVENTION

The present invention relates to methods and apparatus utilizing an ATM switch as a routing backplane in a hub for a local area network. The use of network hubs (also referred to as network concentrators) is well-known in the art. However, a brief overview of network hubs will also be provided to facilitate an understanding of the present invention. Also, ATM switches have been well-described in the art; however, a general overview will be provided below for reference in an understanding of the present invention.

Network Hubs

Generally, network hub or concentrator acts to concentrate wiring for a communications network in a central location such as a facilities telephone wiring closet. The hub comprises a cabinet having multiple ports where each port supports one local area network segment. Each local area network may support multiple devices which may communicate over the local area network. In many such hubs, individual modules are plugged into the cabinet and each module comprises multiple ports (e.g., 16 ports per module is common in the current state of the art.) The modules are interconnected with each other over a backplane bus or the like so that network message packets from a device connected to a LAN segment coupled with a port on module 1 may be communicated to a device connected to a LAN segment coupled with a port on module 2 over the bus.

Network hubs as may be utilized by the present invention are described in greater detail with reference to FIGS. 2(a)-(c) and will be discussed in greater detail below.

Examples of prior an network hubs include the SynOpties' LattisNet System 2000 ™ and LattisNet System 3000 ™ concentrators.

ATM Switches

Generally, a network ATM switches are more fully described in, for example, de Prycher and with reference to standards adopted by the International Telephone and Telegraph Consultative Committee (CCITT). Briefly, it should be understood that ATM is a telecommunication technique or transfer mode implemented to facilitate a broadband network such as the Broadband Integrated Services Digital Network (B-ISDN) in which cells of data are asynchronously transferred between two switching devices without the need to synchronize the clocks of the sender and the receiver packet.

Of course, alternatives to ATM switches have been proposed which employ principles similar to the principles employed by ATM switches. In general, when the term "ATM switch or the like" or the term "ATM Switch" is used herein, such term may be thought of as covering switches having the basic characteristic of packet switching switch with minimal functionality in the network. More specifically, an ATM switch may be thought of as a circuit-oriented, low-overhead switch providing virtual channels which have no flow control or error recovery wherein communication in the virtual channels is accomplished with fixed-size (and relatively short) cells. The virtual channels provide the basis for both switching and for multiplexed transmission. Another important feature of an ATM switch is the possibility to group several virtual channels into one so-called virtual path. ATM switches are perhaps better generally defined at Handel et al., pp. 14-17.

ATM has been the official name adopted by the CCITT for such a network. Asynchronous Time Division (ATD) and Fast Packet Switching are terms which have been employed to describe similar network transfer modes. These alternative networks are discussed in de Prycker at pages 55-56.

The present invention proposes utilizing an ATM switch as a routing backplane or packet switching engine in a more traditional data communications network such as a network employing the well-known CSMA/CD, token ring standards and/or FDDI standards. (It is noted that, for purposes of this specification, the terms CSMA/CD and Ethernet may be used interchangeably and each of these types of systems, e.g., CSMA/CD, token ring and FDDI, are referred to generally as local area network or LAN systems.)

General Overview of ATM switching as applied to the present invention

This specification will describe in greater detail a network hub implementing an ATM switch in accordance with the teachings of the present invention. First, however, it is worthwhile to provide an overview of ATM switching.

In an ATM switch, the information is actually transmitted through the switch in fixed-length through virtual paths/virtual channels which are set up to facilitate such communications. The virtual paths may comprise a plurality of virtual channels. The use of virtual channels/virtual paths allows a large number of connections to be supported on a single physical communications link. In the art, Virtual Path/Virtual channels are generally thought to be allocated during set-up of a communication transmission between two devices (e.g., between two clients) and "tom down" after the communication has completed. For example, in an ATM network implemented to support telephone communications, virtual channels may be set up along the communications link between the caller and the called party at the time the call is placed and then tom down when the telephone conversation ends. The process of setting up and tearing down a virtual path and/or virtual channel generally involves updating translation tables stored in the switch fabric of each switch involved with each virtual path/virtual channel link of the virtual path or virtual channel.

As will be seen, in the present invention, permanent virtual circuits (PVCs) are established which create a fully connected topology of LAN module to LAN module virtual connections. These PVCs actually am comprised of ATM virtual paths. In addition, the dedicated virtual channels interconnecting any two of the hub ports on the various LAN modules are provided. These dedicated virtual channels am implemented as ATM virtual channels.

In the present invention, a device generating cells to be switched by the ATM switch can determine the output port on which it is desired to have the cell transmitted and select an appropriate PVC and dedicated virtual channel on which to input the cell in order to provide for selection of the desired output. In other words, the device (external to the ATM switch) effectively provides for the routing decisions of cell in the ATM switch because them are a known set of PVCs and dedicated virtual channels which provide for the above-mentioned fully connected topology.

Thus, as one important aspect of the present invention, it is desired to provide for a fully connected ATM switch allowing for fast switching of cells with an external "routing entity" providing for routing of the cells. The external muting entity forwards cells through the switch by, for example, putting the destination output port number into the VPI field. The ATM switch fabric is then preconfigured to route the cell to the specified output port. In the described embodiment, the switch fabric is further configured to translate the cell header to indicate in the VPI field the input port number, e.g., the port number on which the cell entered the ATM switch. This feature of the present invention allows the destination to perform source discrimination on received cells.

Presently, one application of the present invention is use of the invention as a multi-port router in which the switch is used as a multi-channel, non-blocking backplane interconnecting multiple router interface modules in parallel. This implementation of the present invention will be discussed in greater detail below in order to provide a better understanding of the present invention and one specific embodiment of the invention.

Figure 3A:
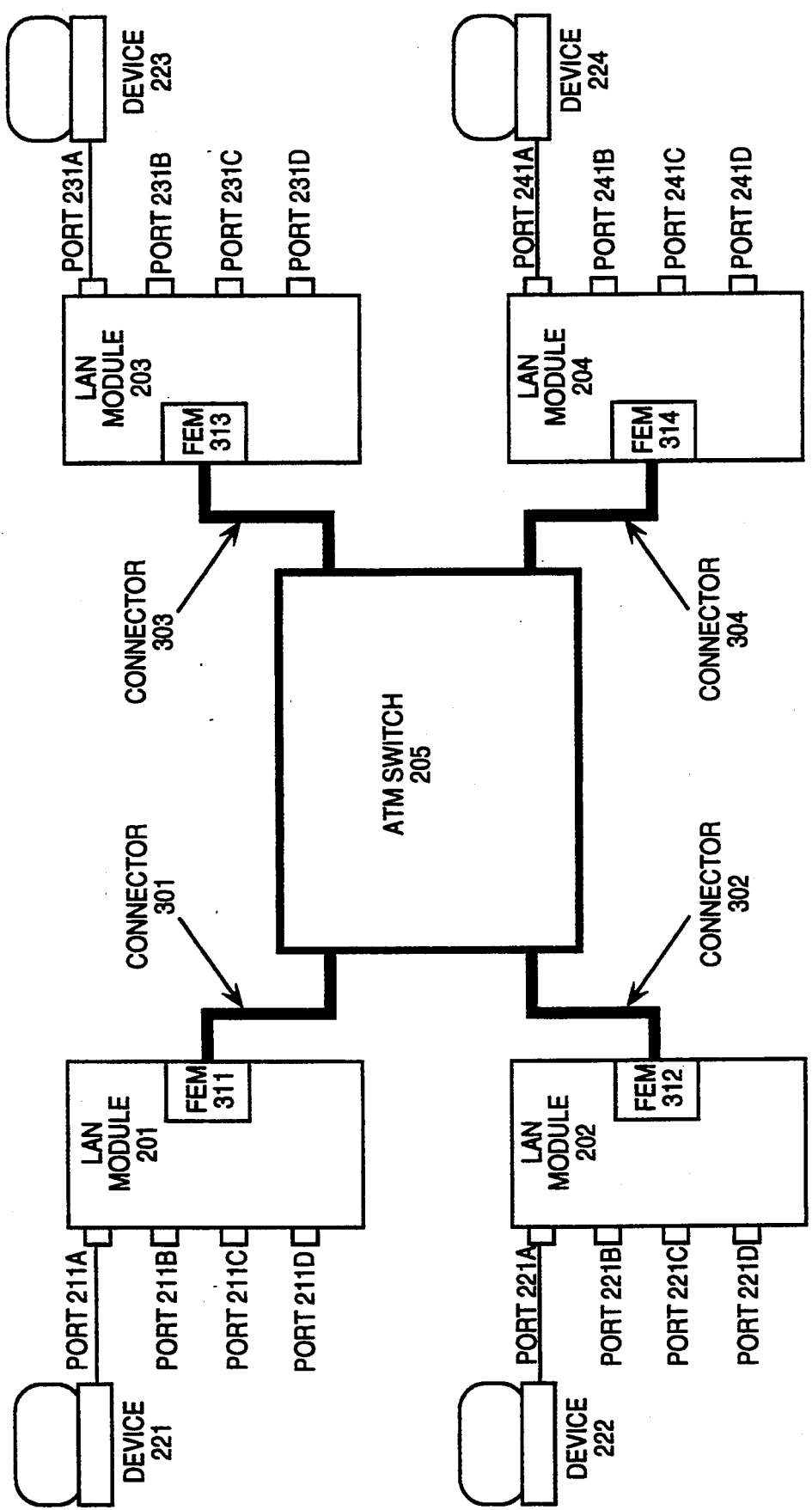
FIG. 3(a) is a diagram illustrating components of a concentrator as may be utilized in the present invention including connectors 301-304.

It is noted that a typical switch 205 in the preferred system comprises 16 input/output ports allowing connection of 16 LAN modules over high speed connectors although for sake of simplicity, in FIG. 3(a) for example, only four LAN modules 201–204 and 4 high speed connectors 301–304 are illustrated as being connected to the switch 205. It will be obvious to one of ordinary skill that the total number of ports supported by a switch may vary from implementation to implementation and such variance should not be considered a departure from the present invention.

In addition, each switch comprises switch fabric 205. Switch fabric is well described with reference to both the Handel et al. and the de Prycher et al. references.

The ATM cell as defined by the CCITT

It may be worthwhile to briefly describe the basic cell structure of an ATM cell as defined by the CCITT and as used by the present invention. Such a cell structure is illustrated by FIG. 1(a) and includes a fixed-size header area 101 and a fixed-size information field or payload area 102. The header area 101 is defined to include 5 8-bit bytes while the information field 102 is defined to include 48 8-bit bytes for a total of 53 8-bit bytes per cell. The information field 102 is available for user information while the header field is well-defined by the CCITT standard and includes necessary overhead data. In fact, two header definitions are set forth by the CCITT standard and these header definitions are described in connection with FIG. 1(b) and FIG. 1(c). The first header definition is used at the B-ISDN user-network interface and the second header definition is used at the B-ISDN network-node interface. The two formats only differ in the first byte.

Figure 1B:
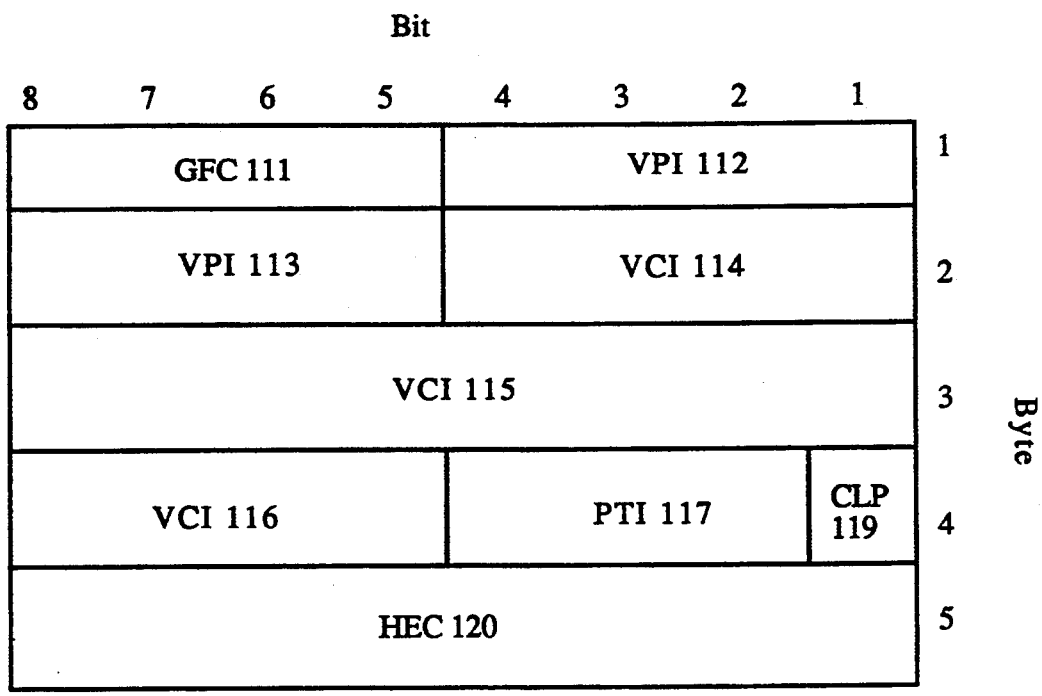

FIG. 1(b) illustrates an ATM cell header for a B-ISDN user-network interface. Field 111 is a 4-bit field used for generic flow control (GFC) which assists in control of traffic flow from ATM connections at the user-network interface. ATM networks do not provide for flow control of the type which is implemented in some packet networks and ATM networks have no facility to store cells over a long period of time. Therefore, inside an ATM network there is no need for generic flow control. Thus, in the header definition of FIG. 1(c), there is not GFC field and the virtual path identifier field 112 is expanded to use the bits made available by elimination of the GFC field 111.

Figure 1C:
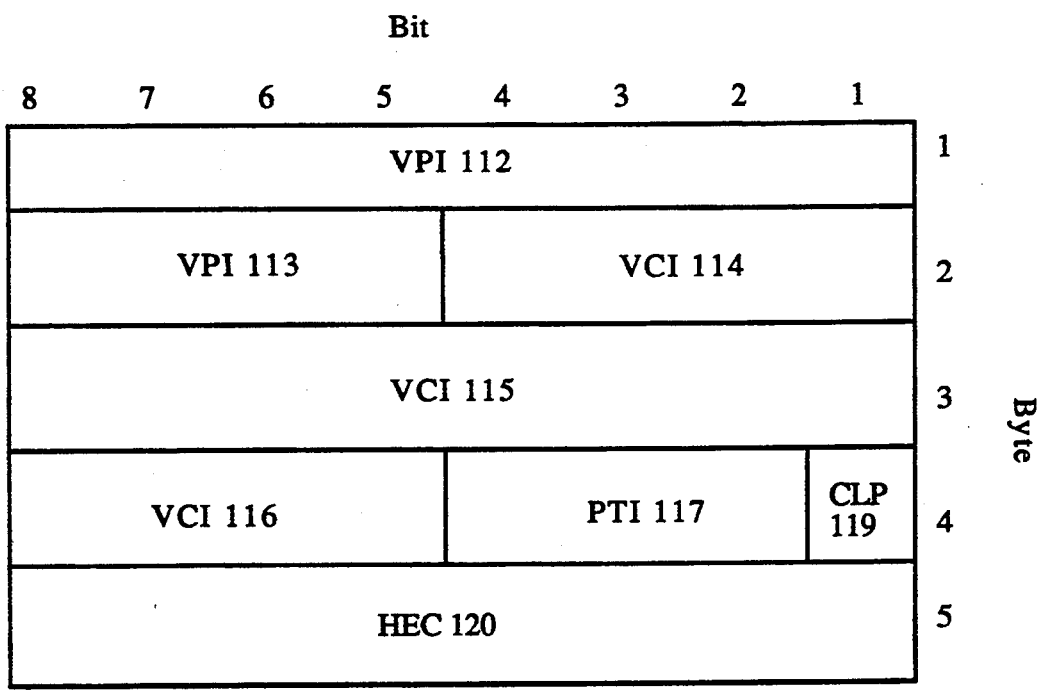

The virtual path identifier (VPI) comprises either 8-bits, in the case of user-network interface headers, or 12-bits, in the case of node-network interface headers. As illustrated in FIGS. 1(b) and 1(c), the 8- and 12-bits respectively are broken down in a first field 112 of either 4- or 8-bits in the first byte of the header and the high order 4-bits in a second field 113 of the second byte of the header. The VPI field identifies a virtual path for routing the cell through the network.

The virtual channel identifier (VCI) comprises 16-bits broken down in three fields, a first field 114 being the low order 4-bits in the second byte of the header, a second field 115 being the 8-bit third byte of the header, and a third field 116 being the high order 4-bits in the fourth byte of the field. The VCI identifies the virtual channel for routing of the cell. Certain values have been defined by the CCITT standard.

Bits 2–4 of the fourth byte of the header comprise the payload type (PTI) field 117 which indicates whether the cell contains user or network management related information.

Bit 1 of the fourth byte is the cell loss priority (CLP) field 119. If the value of the field is 1, the cell is subject to discard, depending on network conditions. If the value of the field is 0, the cell has high priority and, therefore, sufficient network resources have to be allocated to it.

Finally, the header error control field 120 takes the entire fifth byte of the header. It contains the header error control sequence to be processed by the physical layer of the network and is specified in CCITT Recommendation I.432.

As can be appreciated, a header functionality has been kept to a minimum by the standard in order to provide for fast processing in the network. The main functions of the header are identification of the virtual connection and certain maintenance functions. By keeping these functions to a minimum, header processing in the ATM nodes is simple and can be done at very high speeds.

OVERVIEW OF THE HUB OF AN EMBODIMENT OF THE PRESENT INVENTION

Figure 2A:
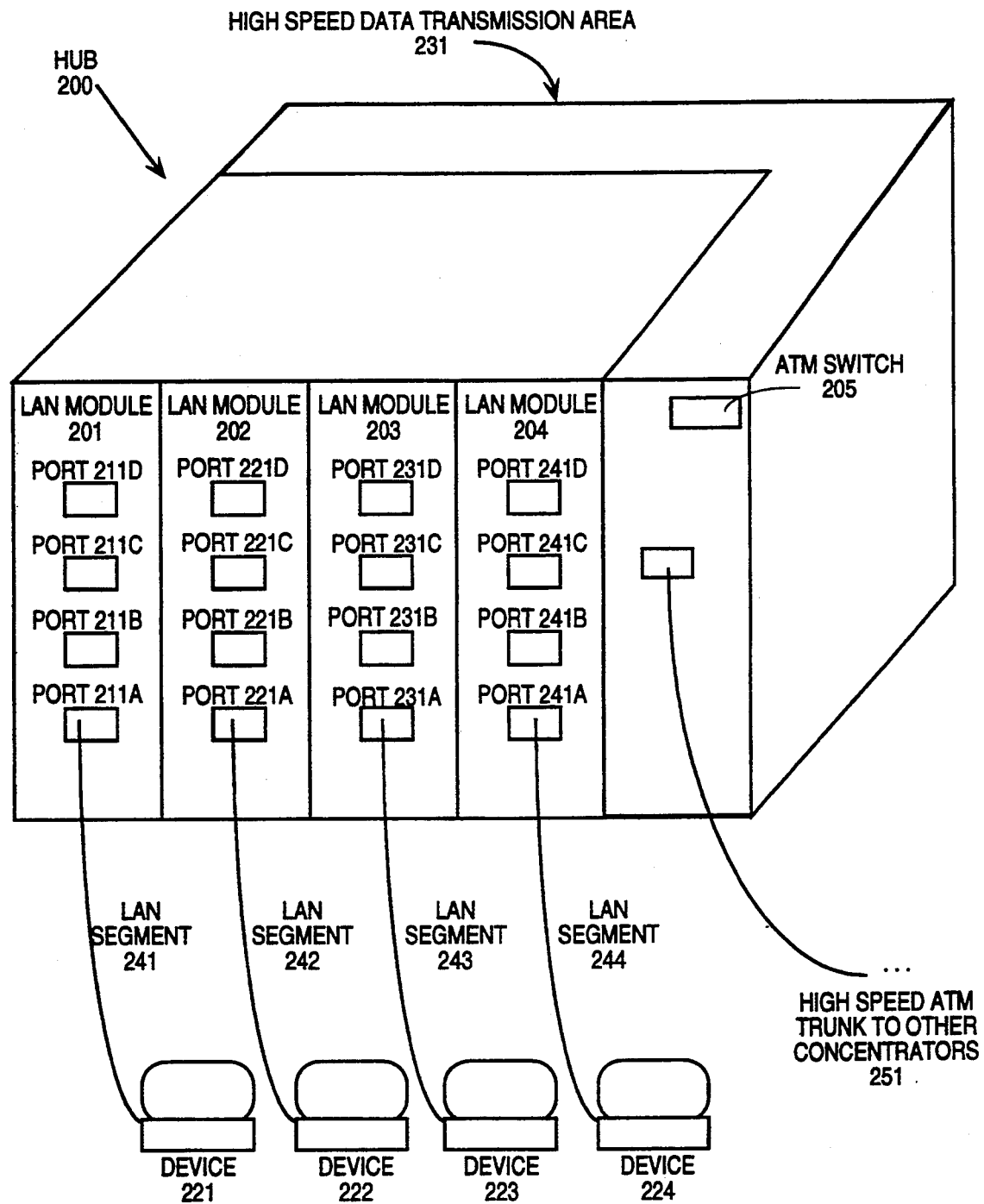
FIG. 2(a) is an illustration of a concentrator as may be utilized by the present invention.

Turning now to FIG. 2(a), one embodiment the present invention is described. A network hub 200 is shown which comprises four LAN modules 201–204 which each are illustrated as having four ports (211A–D, 221A–D, 231A–D and 241A–D corresponding to modules 201–204, respectively). The particular choice of illustrating a hub having four module with four ports each has been made for convenience of illustrating the invention. In fact, embodiments of the present invention are envisioned as being capable of supporting a variable number of modules and each module is expected to have 16 ports. Each of the ports is capable of supporting a LAN segment such as segments 241–244 (again, for ease of illustration only one segment is illustrated for each module).

In addition, the present invention provides for an ATM switch 205 in the hub 200. Although the ATM switch 205 operates substantially as has been described for above in connection with the overview of ATM switches, the ATM switch of the present invention provides for permanent virtual connections (PVCs) which interconnect each of the various modules 201-204 and for dedicated channels interconnecting any two given ports (211A-D, 221A-D, 231A-D and 241A-D). The ATM switch 205 further may provide one or more ports for connecting the ATM switch 205 to other hubs over a high speed ATM trunks (e.g., trunk 251) in order to make up a larger network. In addition to allow larger networks, this technique allows for native ATM hosts (e.g., servers) to be connected to the network.

It is noted that certain local area network technologies operate at what will be termed herein relatively low speeds (i.e., Ethernet at 10 Mb/s, token ring at 16 Mb/s) and provide for sharing the available bandwidth between the various devices attached to the network. Other known local area network technologies operate at other speeds (e.g., FDDI at 100 Mb/s) but still provide for sharing of the available bandwidth. An ATM switch operates at what will be termed herein relatively higher speeds (currently on the order of 155 Mb/s; however this is expected to increase) and, importantly, the full bandwidth of the switch is generally thought of as being available to all devices attached to the network. Thus, FIG. 2(a) illustrates that the area of relatively high speed clam transmission as darkened area 231. This area comprises both high speed connectors used to interconnect the LAN modules 201-204 to the ATM switch module 205 and the ATM switch 205 itself.

Generally, the present invention works by a device such as device 221 transmitting a message packet over its LAN segment 241 to port 211A of module 201. Assume that the message packet was addressed to device 224. LAN module 224 will then forward the message packet to a port of ATM switch 205. Either the ATM switch module 205 or the LAN module 224 comprises a LAN-to-ATM from end interface module which will be described in greater detail with reference to FIGS. 4(a) and 4(b). The from end interface module acts to segment the message packet into ATM cells. (As has been discussed the ATM are of fixed length and provide for a 48-byte information field 102. It is into this information field 102 that the relatively longer message packet is segmented.) In addition, the front end interface module provides the appropriate routing information (i.e., VCI/VPI) in each cell header 101. The process of segmentation and providing appropriate routing information will be discussed in greater detail below with reference to FIGS. 4(a).

As the message packet is segmented, the cells are transmitted to the ATM switch 205 where the cells are routed to an output port as designated by the cell's VCI/VPI. As will be appreciated the output port corresponds to the port associated with the module to which the destination device is attached (i.e., in the illustrative example, device 224 is attached to module 204). The cell is then switched (e.g., demultiplexed) to a buffer where it is reassembled, along with the other cells from the message packet which have been similarly created by the segmentation process and transmitted over the switch, to again form the message packet and the message packet is transmitted on the appropriate LAN segment to the destination device, i.e., over LAN segment 244 to device 224.

Figure 2B:
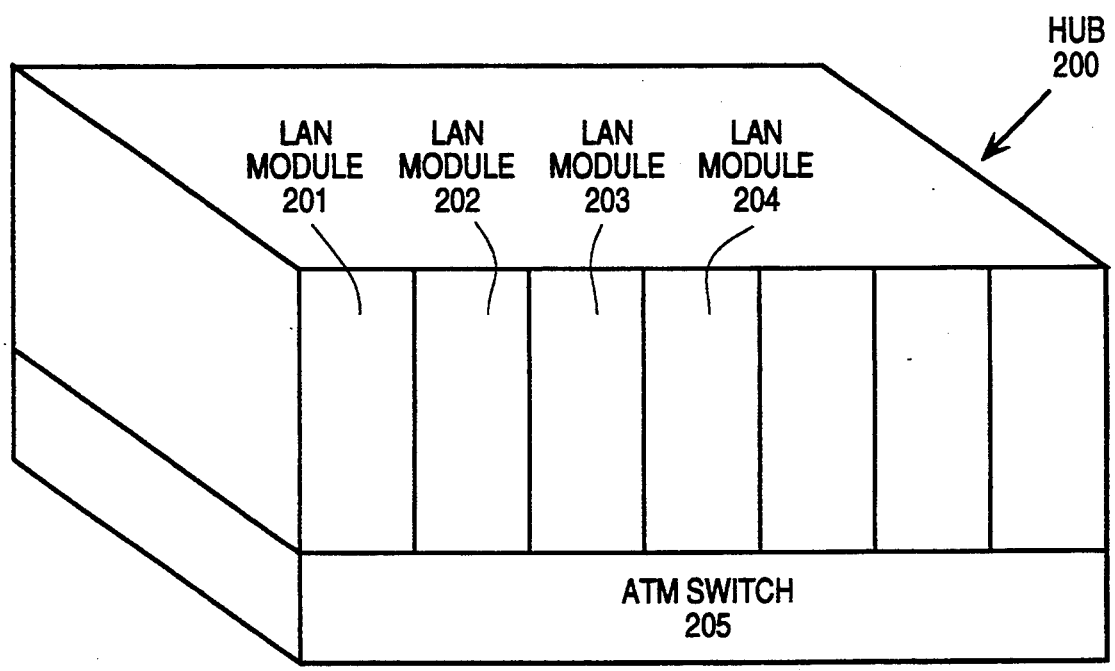
FIGS. 2(b) and 2(c) are front side view and back side view illustrations of an alternative concentrators as may be utilized by the present invention.
Figure 2C:
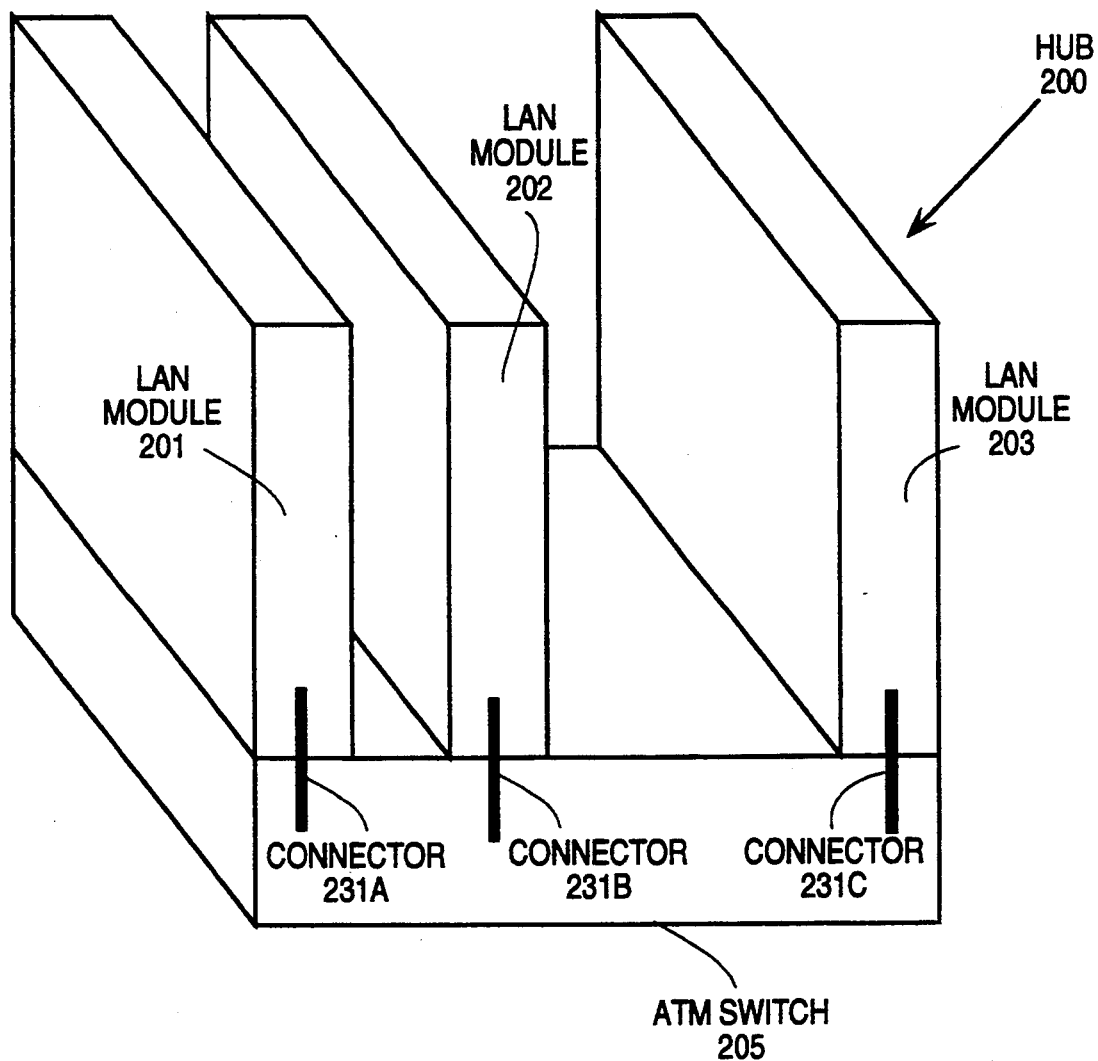

FIGS. 2(b) and 2(c) illustrate an alternative hub 200 configuration in which the ATM switch 205 resides at the bottom of the switch cabinet. FIG. 2(b) illustrates a front view of the alternative hub and FIG. 2(c) illustrates a rear view. The LAN modules (201-204) are still coupled with the ATM switch module over high speed connectors (illustrated as 231A-231C); however, it will be appreciated that the connectors 231A-231C in this configuration may be of a relatively shorter and relatively equal length when compared with the hub configuration of FIG. 2(a).

FIG. 3(a) is useful for illustrating the connectors 301-304 which connect modules 201-204 with the ATM switch 205. FIG. 3(a) also illustrates the LAN-to-ATM front-end modules 311-314 of the present invention. As illustrated, these front-end modules 311-314 reside in the LAN modules 201-204. However, as has been mentioned, alternative designs may provide for the front end-modules to reside in as part of the switch module 205.

The front-end modules will be described in greater detail with reference to FIGS. 4(a) and 4(b). The connectors 301-304, in the described embodiment, are provided as 8-bit connectors operating at, for example, 20-40 MHz. Each connector 301-304 provides for direct connection of the front-end modules 311-314, respectively, to a full-duplex ATM port on the switch module 205.

PERMANENT VIRTUAL CIRCUITS/DEDICATED VIRTUAL CHANNELS

Figure 3B:
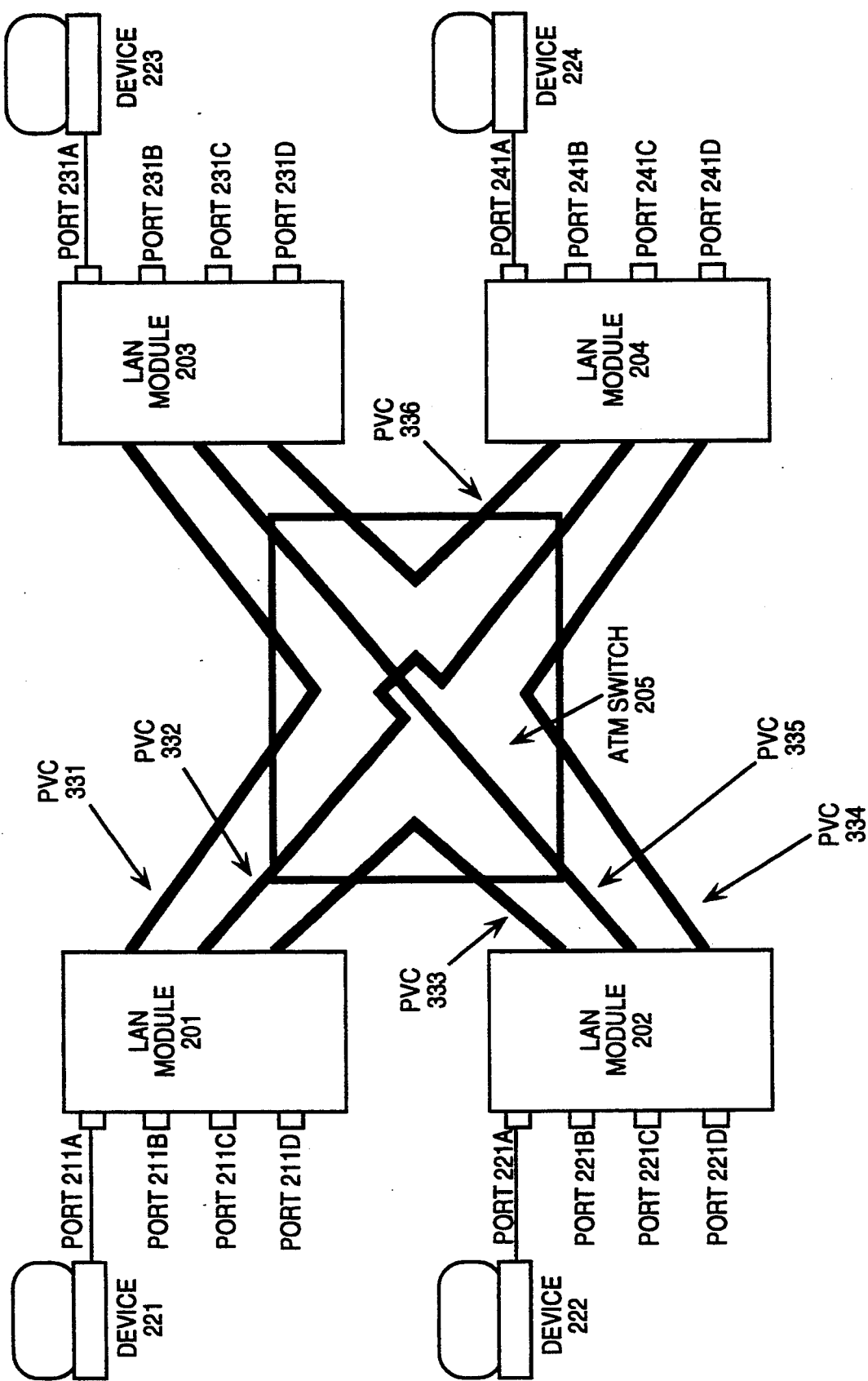
FIG. 3(b) is a diagram illustrating components of a concentrator of the present invention and illustrating permanent virtual circuits 331-336 interconnecting the host modules 201-204.

Turning now to FIG. 3(b), the concept of permanent virtual circuits as utilized by the present invention is described in greater detail. FIG. 3(b) illustrates a network as may be implemented by the present invention including permanent virtual circuits (PVCs) 331-336 providing for a fully connected topology of module to module virtual connections. Each of the PVCs 331-336, in fact, represents a pair of uni-directional connections between two modules although for ease of illustration the connections are illustrated as a single line. For example, PVC 331 provides a full-duplex connection through switch 205 between module 201 and 203; PVC 332 provides a connection between module 201 and 204; and PVC 333 provides a connection between module 201 and 202.

Therefore, in the example described above, the message packet originated by device 221 with an intended destination of device 224 is routed through module 201 over PVC 332 through switch 205 to module 204 and then out port 241A to device 224.

As was mentioned, the PVCs 331-336 are implemented as ATM virtual paths. In the described system, the PVCs 331-336 are permanent in the sense that the ATM switch 205 provides for switch translation tables which allow switching of ATM cells from an input port to an output port based on VPI and VCI information. As was mentioned above, in many ATM switches, these switch translation tables are dynamic with entries being added and deleted as virtual paths and virtual channels are set up and tom down during transmission of messages in the network. However, in the described embodiment, the VPI entries establishing the PVCs 331-336 are not deleted (and, therefore, the virtual path/PVC is permanent) during operation of the network. This prevents delays in retransmission of cells which may otherwise be caused by set-up/tear-down time for virtual paths. As the number of virtual paths is limited (one module-to-module connection), it is not felt the overhead associated with maintaining the permanent switch table entries out weighs the benefits of avoiding set-up and tear-down overhead.

In the described embodiment, $N*(N+1)$ permanent virtual circuits are configured on for the ATM switch where N is the number of LAN modules in the concentrator. In particular, there are N permanent virtual circuits provided for each LAN module allowing for a fully connected topology between a LAN module and all destination modules (including itself) as shown in Table I (i.e., $N^2$ PVCs) and there is one permanent virtual connection provided to allow for broadcast connections (i.e., N additional PVCs, thus providing for a total of $N*(N+1)$). The use of the broadcast PVC may be useful, for example, to broadcast source address information for storage in address lookup tables as will be discussed in greater detail below in connection with FIG. 4(a).

Of course, in an alternative embodiment, use of virtual circuits, while not permanent, may be employed without departure from the spirit and scope of aspects of the present invention.

Table I illustrates a switch translation table for translating VPI's in the network described by FIG. 3(b). It is noted that input port 1 corresponds to the port of the switch to which module 201 is connected; input port 2 corresponds to the port of the switch to which module 202 is connected etc. Also, for sake of simplifying the illustration, PVCs connecting a module with itself are not illustrated. However, in the present invention it is possible that a device 221 may transmit a message packet to a destination device which is also coupled with module 201. It is noted that it is possible for a device to transmit a message packet to a destination device coupled with the same LAN segment; in this situation, it is thought to be preferable to filter out these messages rather than transmit the message over the ATM switch. It is also possible to configure a system in which messages with a destination address on the same module will not be routed through the ATM switch and will instead be directly routed by the module to the appropriate output port. Operation of the described network, including routing of segmented message packets by switch 205, can be the same regardless of whether the destination device is coupled with the same module as the source device.

TABLE I

| Input # | Input VPI # | Output Port # | Output VPI # | PVC # |
|---------|-------------|---------------|--------------|-------|
| 1 | 1 | 1 | 1 | Not shown |
| 1 | 2 | 2 | 1 | 333 |
| 1 | 3 | 3 | 1 | 331 |
| 1 | 4 | 4 | 1 | 332 |
| 2 | 1 | 1 | 2 | 333 |
| 2 | 2 | 2 | 2 | Not shown |
| 2 | 3 | 3 | 2 | 335 |
| 2 | 4 | 4 | 2 | 334 |
| 3 | 1 | 1 | 3 | 331 |
| 3 | 2 | 2 | 3 | 335 |
| 3 | 3 | 3 | 3 | Not shown |
| 3 | 4 | 4 | 3 | 336 |
| 4 | 1 | 1 | 4 | 332 |
| 4 | 2 | 2 | 4 | 334 |
| 4 | 3 | 3 | 4 | 336 |
| 4 | 4 | 4 | 4 | Not shown |

It is also noted that, in the described embodiment, the input VPI number is the same as the output port number and the VPI of each cell is translated by the switch fabric to be the input port number. This allows for simplicity in routing and for identification of the source module by the destination module/device. In order to provide for packet reassembly using AAL-5, it is of course necessary to provide identification of the source module.

Of course, alternative embodiments may employ look-up tables or the like to provide for similar information and not have the described direct correspondence with port numbers.

Figure 3C:
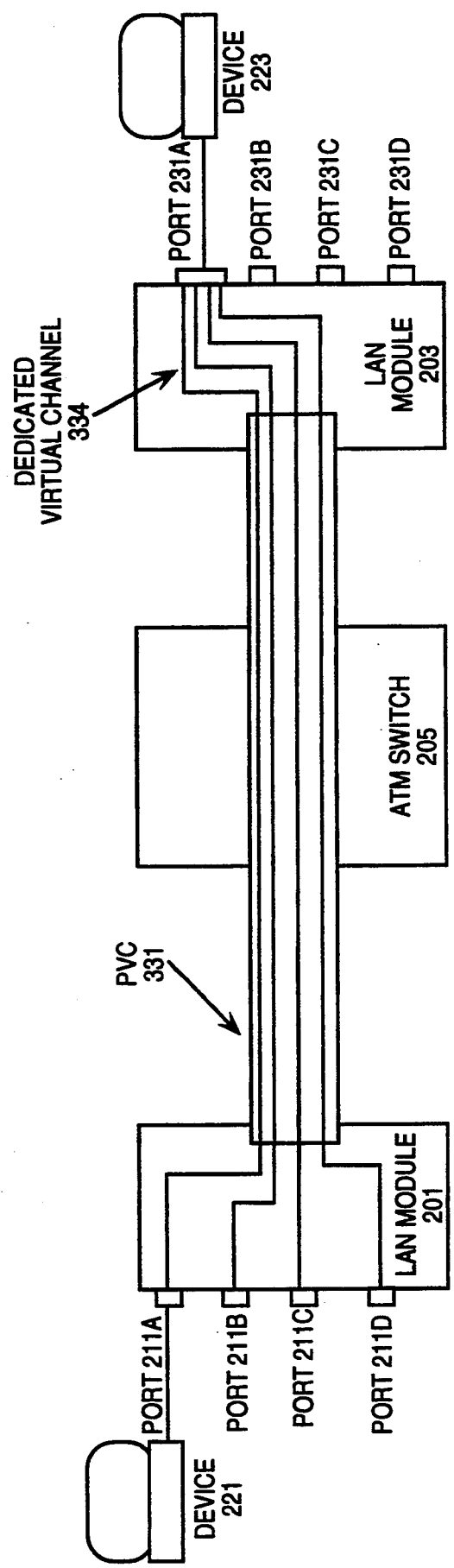
FIG. 3(c) is a diagram illustrating dedicated virtual circuits interconnecting ports in a concentrator as may be utilized by the present invention.

FIG. 3(c) illustrates the concept of dedicated virtual channels as may be employed by the present invention. The dedicated virtual channels provide for port-to-port interconnection. FIG. 3(c) illustrates interconnection of port 231A of module 203 to each of ports 211A-D of module 201 over dedicated virtual channels 334 which are channeled over permanent virtual circuit 331. Similar dedicated virtual channels may be set up for each of the other ports and dedicated virtual channels are also set up for port 231 over each of the other PVCs (i.e., 332-336).

In the described embodiment, as has been discussed, the VPI field is used to indicate the input/output port number and additionally provides routing information for the switch 205. In a single hub configuration of the present invention, the ATM switch is, in fact, configured to act as a VP switch (switching cells solely based on the VPI field of the ATM cell header and keeping the VCI field intact). Therefore, as has been described, a cell arriving on port N with its VPI value set to M will be routed to exit on port M with its VPI field set to N. In this configuration the VCI field is neither interpreted or changed by the switch fabric. This allows using the VCI field to indicate the input port number (e.g., port 231A which may be indicated as port 1 of module 203 by setting the upper bits of the VCI field to $0001_2$) and to indicate the output port number (e.g., port 211D on module 201 which may be indicated by setting the lower bits of the VCI field to $0010_2$). As will be described, the destination port number (and the destination module) is extracted from a look-up table 405 in the front-end module.

LAN-TO-ATM FRONT END MODULE

Figure 4A:
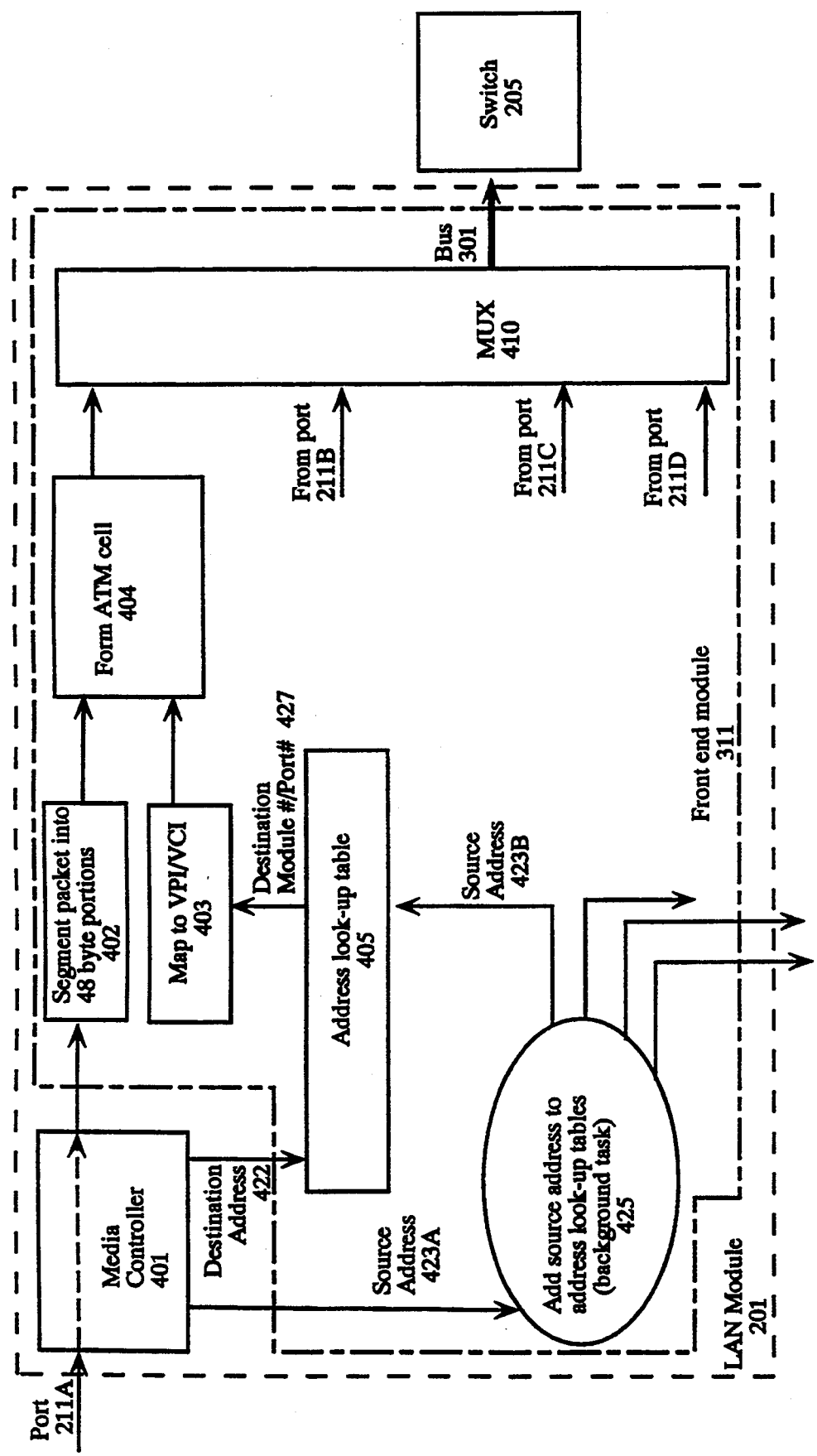
FIGS. 4(a) and 4(b) illustrate an ATM-to-LAN front end module as may be utilized by the present invention.
Figure 4B:
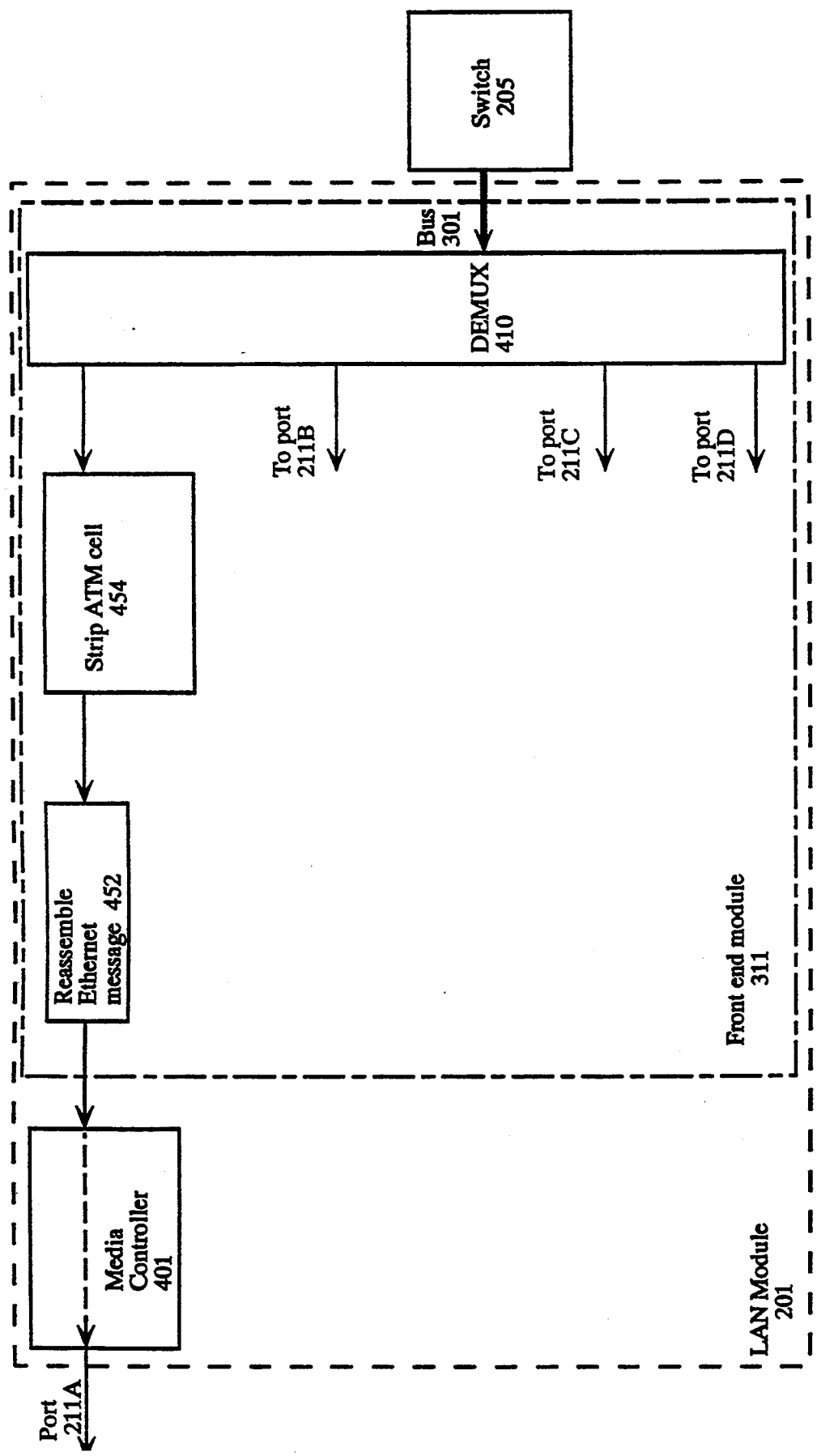

FIGS. 4(a) and 4(b) illustrate the LAN-to-ATM front end module of the present invention. FIG. 4(a) illustrates the transmission half of the module and FIG. 4(b) illustrates the receive half of the circuitry.

Generally, the front-end module provides at least the following four functions:

(1) Address learning and propagation—This involves latching the sender address (e.g., an IP or MAC address) and propagating the association "address X is reachable by module #M, port #N" to the other front end modules;

(2) Address look-up—This involves determining which VPI/VCI to use so that the packet will be transmitted from the hub 200 on the correct outgoing LAN segment (e.g., segments 241-244); and (3) Multiplexing and demultiplexing—This involves combining LAN message packets from multiple ports (e.g., 16) into a single cell stream going into an ATM port over a high speed connector (e.g., one of connectors 301-304) and distributing the cells arriving from the ATM switch to the correct port on the module; and (4) Segmentation/reassembly—This involves segmenting message packets which may be of some variable length (such as Ethernet message packets) into relatively small and fixed length ATM cells before transmission to the ATM switch and reassembling the ATM cells into message packets at the other end.

As one important aspect of the present invention, message packets are processed "on the fly" as they arrive at each stage of the front end module without waiting for the complete packet to arrive.

FIG. 4(a) describes diagramatically the process of and circuitry for receiving an information packet at LAN module 201-204 and providing the information contained therein to the switch 205 in the form of ATM cells. FIG. 4(b) describes diagramatically the process of and circuitry for receiving ATM cells from the switch 205 and forming the ATM cells into information packets to be sent to devices attached to a LAN module 201-204.

Address learning and propagation

Initially, a variable length information packet is received by media controller circuits 401. The media controller circuits 401 function to provide an interface between the LAN segment and the front end module and in this respect provide conventional functions of a concentrator host module to backplane interface. In addition, the media controller circuits 401 provide for stripping of the source address and destination address from the information packet. The source address is then added by a background process 425 to address look up tables (such as address lookup table 405) in each of the front end modules on the concentrator. (As illustrated, the source address is provided on line 423A to the background process 425; however, in certain embodiments the background process may, for example, be running within media controller 401 and, therefore, there may be no need to supply the source address on a separate line). It is illustrated that the background process 425 provides the source address to address lookup table 405 on line 423B. For example, in certain embodiments, the source address may be provided to lookup tables residing in other LAN modules (e.g., 202-204) over dedicated administrative bus or, as described above, in the form of ATM cells switched through the ATM switch 205 over broadcast PVCs (or over a limited broadcast PVC to a sub-set of the from end modules 201-204).

The basic format for the source address lookup table 405 is given below is Table II.

TABLE 11

| Source Address | LAN Module # | Port # |
| --- | --- | --- |
| The MAC, IP, etc. address of a device transmitting message | The module # on which the message was received | The port number on which the message was the received |

Thus, as one feature of the present invention, by recording in the address lookup tables associated with each front end module the source address from messages and corresponding information identifying the LAN module 201-204 and port number on which the message arrived, the system may be relatively self-configuring. It is noted that, as described in connection with Table I, the VPI and VCI numbers used for routing ATM cells may be set up to correspond to the module and port numbers identified in Table II. The background process monitors all packets arriving at the LAN module 201-204; however it records timestamp information as the module arrive and only propagates the source address/LAN module and port information on a periodic basis.

In the event that an entry is made in the table 405 for a particular source address and later notification is received of the device having the recorded source address residing at a different LAN module/port, the table 405 is updated on the assumption that the device has been moved from one LAN module/port to another.

In the described embodiment, the address look-up table 405 is stored in a high speed content addressable memory (CAM) or similar device allowing fast look-up of addresses. It is recognized that a CAM is a relatively expensive memory device, and therefore it is desirable to keep its size relatively small. Therefore, in order to minimize the required size of the CAM, the front end module may provide for aging of the addresses and providing for example, the least recently used address entries to a slower (and less expensive) memory as space is required in the CAM for more recently used address entries. In this way, there is no need to dynamically create and release ATM connections; rather "aging" is simply accomplished by moving address entries from the CAM to slower memory.

Approximately once per day, the background process can remove entries in the table 405 (presumably residing the slower memory) which have not been used during the past day. It is assumed that devices that have not transmitted during this period have been removed from the network. It the device is reconnected (or again transmits), the table 405 can be dynamically updated using the described process. Of course, in certain embodiments, periods shorter than or longer than a day may be chosen for flushing the table 405.

Address Look-up

As was mentioned above, the media controller circuits 401 provide for latching the destination address as well as the source address of messages. The destination address is used, as illustrated by FIG. 4(a), to lookup an entry in the address look-up table. As has just been mentioned, at least portions of the address look-up table may reside in a relatively fast content addressable memory. Using conventional techniques, if an entry is not found in the CAM, a lookup may be carried out in the table residing on a slower memory and the entry can then be loaded into the CAM.

The port and module number from the entry found in the lookup table may, optionally, be provided to circuitry 403 for mapping the module/port to a VPI/VCI. However, in the described embodiment, the module and port number are used directly as VPI and VCI information avoiding the need for translation except as mentioned above in connection with formatting the VCI information to indicate the input port number in the upper bits of the VCI field and to indicate the output port number (e.g., the port number from the look-up table) setting the lower bits of the VCI field.

This single address look up technique provides for "near cut-through" switching of packets between similar local area networks segments (e.g., from Ethernet to Ethernet). Information packets which require new encapsulation or filtering (address or protocol based filtering) can be forwarded to an interim module (not shown), e.g., a "firewall" bridge/router.

Importantly, because the destination address is typically near the beginning of the information packet, the address look-up can and does occur in the present invention before the entire information packet has arrived from the LAN segment. Likewise, the segmentation process discussed below and the process of forming ATM cells and sending the ATM cells to the ATM switch 205 (also discussed below) can begin before arrival of the entire information packet.

Segmentation

The information packet is segmented, using a technique such as AAL-5 segmentation, into ATM cells utilizing segmentation circuitry 402. Segmentation techniques are well-known in the art. For example, de Prychef and Handel et al. each describe AAL-3 and AAL-4 segmentation and reassembly in detail. AAL-3 and AAL-4 segmentation and reassembly techniques are deemed to provide for connectionless as well as connection oriented service. AAL-5 is a later defined (and now well-known) technique which is a subset of AAL-3/AAL-4 providing only for connection oriented communication. AAL-5 is described in CCITT I.363, Section 6. In any event, any of a number of known segmentation techniques may be utilized without departure from the spirit and scope of the present invention.

The end result is that, in the described system, the information packet is segmented into 48-byte segments. Header information 101, including the VPI/VCI information from circuit 403 is added to the 48-byte segments to form ATM cells. The ATM cells are then forwarded to multiplexor 410.

Multiplexing of ATM cells

The ATM cells from each of the front end modules of a particular LAN module (e.g., one of LAN modules 201–204) are queued on the input ports of a round robin multiplexor 410. The multiplexor 410 combines cells from the various input ports of a LAN module onto connector 301 for presentation to the ATM switch 205 on a single ATM port.

Although the multiplexor 410 has been described as a round robin multiplexor, variations are possible in alternative embodiments. For example, to minimize switching latency, the multiplexor 410 may "skip" input ports that do not have a cell queued up for delivery to the ATM switch. Further, the multiplexor 410 may operator under control of circuitry which provides priority to certain input/output ports.

Demultiplexing

Turning now to FIG. 4(b), receiving of ATM cells and reassembly of the ATM cells into information packets for transmission on the LAN segments is illustrated. ATM cells are received from ATM switch 205 after having been routed to the appropriate output port based on the VPI (and, in some embodiments the VPI/VCI). The ATM cells are then provided to demultiplexor 410 over connector 301.

The demultiplexor 410 provides the ATM cell to the appropriate output port of the demultiplexor 410 based on destination port information in the VCI (the format of the VCI including source port and destination port information has been previously described).

Reassembly of LAN information packets

As the ATM cells arrive at the output ports of the demultiplexor, the cells are stripped of the ATM header 101 information, block 454, and provided to circuitry 452 for reassembling the information packet. The 48-byte information field 102 of the arriving cell is then provided to reassembly circuitry 452 for reassembling the information packet in accordance with known AAL-5 procedures. As one aspect of the present invention, the LAN information packet can start to be forwarded before all ATM cells containing information making up the information packet have been received from the ATM switch 205. In the described embodiment, circuitry 452 provides for buffering of at least the first two ATM cells of each information packet. This allows for compensating/smoothing of jitter in cell arrival time caused by collision delays in the switch fabric of switch 205.

In certain embodiments to increase throughput it may be desirable to provide for more than a single re, assembly circuit 452 per LAN port.

The reassembled information packet is provided to media controller circuitry 401 and onto the LAN segment over port 211 as it is being reassembled.

ALTERNATIVES TO THE PREFERRED EMBODIMENT OF THE PRESENT INVENTION

There are, of course, alternatives to the described embodiment which are within the reach of one of ordinary skill in the relevant art. The present invention is intended to be limited only by the claims presented below.

Thus, what has been disclosed is a method and apparatus which provides for a routing device or routing entity which utilizes an ATM switch as a multi-channel, non-blocking backplane interconnecting multiple router interface modules in parallel.

What is claimed is:

1. A data communication network comprising:
    (a) a first device for communicating an information packet onto said communication network;
    (b) a second device for receiving said information packet communicated onto said communication network; and
    (c) a concentrator having:
        (i) a first local area network module supporting a first local area network segment, said first device coupled with said first local area network segment for receiving said information packet;
        (ii) a second local area network module supporting a second local area network segment, said second device coupled with said second local area network segment for providing said information packet to said second device; and
        (iii) a connection oriented router having a first port and a second port, said first port coupled to receive said information from said first device through said first local area network module, said second port coupled to provide said information to said second device through said second local area network module, said router further comprising circuitry for segmenting said information packet when received on said first port into a plurality of fixed length cells, for routing said fixed length cells to said second port, and for reassembling said plurality of fixed length cells back into said information packet prior to retransmission of said information packet to said second device over said second port.

2. The network as recited by claim 1 wherein said first local area network module is an module implementing a carrier sense, multiple access media access method.

3. The network as recited by claim 1 wherein said information packet is a variable length information packet.

4. The network as recited by claim 1 wherein said router comprises an asynchronous transfer mode switch module.

5. The network as recited by claim 4 wherein said asynchronous transfer mode switch module is configured to provide a virtual circuit providing for communication of information between devices coupled with said first local area network module and said second local area network module.

6. The network as recited by claim 5 wherein said virtual circuit is configured as a permanent virtual path by said asynchronous transfer mode switch module.

7. The network as recited by claim 5 wherein said asynchronous transfer mode switch module is configured to provide a virtual path over said virtual circuit to provide communication between said first local area network segment and said second local area network segment.

8. A hub for providing communication between devices in a communication network, said hub comprising:
(a) a first local area network front-end module comprising at least a first front-end port and a second front-end port, said first front-end port for supporting communication with devices coupled with a first local area network segment, said second front-end port for supporting communication with devices coupled with a second local area network segment;
(b) a second local area network front-end module comprising at least a third front-end port and a fourth front-end port, said third front-end port for supporting communication with devices coupled with a third local area network segment, said fourth front-end port for supporting communication with devices coupled with a fourth local area network segment;
(c) a third local area network front-end module comprising at least a fifth front-end port and a sixth front-end port, said fifth front-end port for supporting communication with devices coupled with a fifth local area network segment, said sixth front-end port for supporting communication with devices coupled with a sixth local area network segment;
(d) an ATM switch module having a first ATM port for communicating with said first local area network module, a second ATM port for communicating with said second local area network module and a third ATM port for communicating with said third local area network module, said ATM switch providing for routing of information between said devices coupled with said first, second and third local area network modules, said ATM switch module configured to provide a fully connected topology of module-to-module connections between said first local area network module, said second local area network module and said third local area network module.

9. The hub as recited by claim 8 wherein said module-to-module connections comprise virtual circuit connections.

10. The hub recited by claim 8 wherein said module-to-module connections comprise permanent virtual circuit connections.

11. The hub as recited by claim 10 wherein said permanent virtual circuit connections comprise ATM virtual paths.

12. The hub as recited by claim 8 wherein said ATM switch module is configured to provide virtual channel connections interconnecting each of said first through sixth local area network segments.

13. The hub as recited by claim 8 further comprising segmentation circuitry for segmenting variable length information packets received by said hub into fixed length cells.

14. The hub as recited by claim 9 further comprising reassembly circuitry for reassembling said fixed length cells into variable length information packets.

15. The hub as recited by claim 8 further comprising address look-up circuitry for looking up, based on destination addresses provided in information packets received from said devices, routing information for routing information through said ATM switch module.

16. The hub as recited by claim 15 wherein said routing information comprises virtual channel and virtual path identification information.

17. The hub as recited by claim 15 wherein said routing information comprises module and port number information.

18. A method of providing for routing of a variable length information packet in a local area network, said local area network comprising at least a first device coupled with a first local area network segment and a second device coupled with a second local area network segment, said first local area network segment coupled with a first local area network module, said second local area network segment coupled with a second local area network module, said method comprising the steps of:
(a) said first device communicating said variable length information packet to said first local area network module over said first local area network segment;
(b) said first local area network module receiving said variable length information packet;
(c) said first local area network module providing said variable length information packet to a first port of a connection oriented router;
(d) said router segmenting said variable length information packet into a plurality of fixed length cells;
(e) said router routing said fixed length cells to a second port of said router;
(f) said router reassembling said plurality of fixed length cells into said variable length information packet;
(g) said router providing said variable length information packet to said second local area network module;
(h) said local area network module providing said variable length information to said second device on said second local area network segment.

19. The method as recited by claim 18 wherein said router comprises an ATM switch.

20. The method as recited by claim 19 wherein said ATM switch is configured with a virtual circuit providing for communication between said first local area network module and said second local area network module.

21. The method as recited by claim 19 wherein said ATM switch is configured with a permanent virtual circuit providing for communication between said first local area network module and said second local area network module.

22. The method as recited by claim 20 wherein said ATM switch is configured with virtual path providing for communication between said first local area network segment and said second local area network segment.

* * * * *